US011063950B2

(12) United States Patent
Ringer et al.

(10) Patent No.: US 11,063,950 B2
(45) Date of Patent: Jul. 13, 2021

(54) SECURE REMOTE DESKTOP SESSION

(71) Applicant: Microsoft Technology Licensing, LLC, Redmond, WA (US)

(72) Inventors: George Ringer, Mercer Island, WA (US); Jeromy Scott Statia, Arlington, WA (US); Dayne Allen Thompson, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 15/177,817

(22) Filed: Jun. 9, 2016

(65) Prior Publication Data
US 2017/0359348 A1    Dec. 14, 2017

(51) Int. Cl.
*H04L 29/06* (2006.01)
*G06F 21/62* (2013.01)

(52) U.S. Cl.
CPC ........ *H04L 63/101* (2013.01); *G06F 21/6218* (2013.01); *H04L 67/42* (2013.01)

(58) Field of Classification Search
CPC .... H04L 62/101; H04L 67/42; G06F 21/6218
See application file for complete search history.

(56) References Cited

U.S. PATENT DOCUMENTS

| 7,441,188 | B1* | 10/2008 | Russell | G06F 8/36 |
| | | | | 715/273 |
| 7,600,024 | B2 | 10/2009 | Jodh et al. | |
| 8,365,304 | B2 | 1/2013 | Sebesta et al. | |
| 8,528,062 | B1* | 9/2013 | Connor | H04L 63/0838 |
| | | | | 726/6 |
| 9,210,212 | B2 | 12/2015 | Ivashin et al. | |
| 9,210,213 | B2 | 12/2015 | Momchilov et al. | |
| 2003/0051215 | A1* | 3/2003 | Nakao | H04N 1/00416 |
| | | | | 715/234 |
| 2003/0101245 | A1* | 5/2003 | Srinivasan | G06F 9/44505 |
| | | | | 709/221 |
| 2004/0111720 | A1* | 6/2004 | Vertes | G06F 9/4426 |
| | | | | 717/164 |
| 2007/0044149 | A1* | 2/2007 | Xavier | G06F 21/562 |
| | | | | 726/22 |
| 2010/0085150 | A1* | 4/2010 | Aikawa | G06Q 20/341 |
| | | | | 340/5.82 |

(Continued)

OTHER PUBLICATIONS

Gokkan Gercek, "Transforming Traditional Labs into Virtual Computing Labs for Distance Education," Feb. 2008, pp. 46-51.*

(Continued)

*Primary Examiner* — Luu T Pham
*Assistant Examiner* — Canh Le
(74) *Attorney, Agent, or Firm* — Holzer Patel Drennan

(57) ABSTRACT

A system discloses providing secure remote desktop session host experience to a user for a selected application while controlling the user's access to non-core functionalities of the selected application. An implementation of the system disclosed herein identifies a non-core functionality of an application running on a server, flags the executable files, shared object library files, and the registration keys necessary for the non-core functionality of the application, and disables the application's access to the identified executable files, the identified shared object library files, and the identified registration keys.

17 Claims, 8 Drawing Sheets

(56) References Cited

U.S. PATENT DOCUMENTS

| | | | | |
|---|---|---|---|---|
| 2011/0292432 | A1* | 12/2011 | Matsusaka | H04N 1/00352 358/1.14 |
| 2012/0071230 | A1* | 3/2012 | Lagercrantz | G07F 17/3293 463/22 |
| 2014/0258446 | A1* | 9/2014 | Bursell | G06F 15/177 709/217 |
| 2015/0326588 | A1* | 11/2015 | Vissamsetty | H04L 63/1491 726/23 |
| 2016/0197730 | A1* | 7/2016 | Lu | H04L 9/3247 713/176 |
| 2016/0224373 | A1* | 8/2016 | Harris | G06F 9/5027 |
| 2016/0283198 | A1* | 9/2016 | Walker | G06F 8/30 |
| 2016/0357958 | A1* | 12/2016 | Guidry | G06F 21/53 |

OTHER PUBLICATIONS

Yoon-CHan Jhi et al. ,"Program Characterization Using Runtime Values and its Application to Software Plagiarism Detection," Septmener, 2015.*

"Setting up Desktop and Application Pools in View", Published on: Mar. 26, 2015 Available at: https://pubs.vmware.com/horizon-view-60/topic/com.vmware.ICbase/PDF/horizon-view-602-setting-up-desktops.pdf.

"HP ThinShell", Published on: Mar. 2014 Available at: http://h10032.www1.hp.com/ctg/Manual/c04438405.

Almeida, George, "Restrict remote desktop users to a single session", Published on: Oct. 11, 2015 Available at: http://www.georgealmeida.com/2015/10/restrict-remote-desktop-users-to-a-single-session/.

"WinConnect Server ES User Manual", Retrieved on: Feb. 9, 2016 Available at: http://www.thinsoftinc.com/download/WinConnectESUserManual.pdf.

Thomas, Orin, "Windows Server 2008 R2", In Publication of John Wiley & Sons, Retrieved on: Feb. 9, 2016, 578 pages.

Sloane, et al., "Configuring Kiosk Mode", In White Paper of VMware, Mar. 26, 2015, pp. 1-11.

Epstein, et al., "RemoteApp Publishing on AWS", In White Paper of Corpinfo, Nov. 2014, pp. 1-14.

"Quest® vWorkspace Administration Guide Version 7.2 MR1", Retrieved on: Feb. 9, 2016 Available at: http://us-downloads.quest.com/Repository/support.quest.com/vWorkspace/7.2.1/Documentation/vWorkspaceAdminGuide_7.2MR1.pdf.

"InTouch for Terminal Services Deployment Guide Planning and Implementation Guidelines", Retrieved on: Feb. 9, 2016 Available at: http://www.google.co.in/url?sa=t&rct=j&q=&esrc=s&frm=1&source=web&cd=1&cad=rja&uact=8&ved=0ahUKEwi_ndfy3OzKAhUEH44KHfhaDEYO.

Rouse, Margaret, "what is kiosk mode (Windows assigned access)", Published on: Dec. 2014 Available at: http://searchenterprisedesktop.techtarget.com/definition/kiosk-mode.

Lee, Thomas, "RemoteApp and Desktop Connection", Published on: Aug. 3, 2009 Available at: https://technet.microsoft.com/en-us/library/dd560650(v=ws.10).aspx.

Wettlaufer, Jeff, "Windows Embedded 8.1: Assigned Access and Windows Embedded Lockdown", Published on: Oct. 16, 2013 Available at: http://blogs.msdn.com/b/windows-embedded/archive/2013/10/16/windows-embedded-8-1-assigned-access-and-windows-embedded-lockdown.aspx.

"Lock Down Remote Desktop Services Server 2012 / RDS 2012 R2", Published on: Oct. 1, 2013 Available at: http://www.it.ltsoy.com/windows/lock-down-remote-desktop-services-server-2012/.

"How to Restrict Users from Accessing Local Drives of an RD Session Host Server while using RemoteApp Programs", Published on: May 26, 2011 Available at: https://blogs.msdn.microsoft.com/rds/2011/05/26/how-to-restrict-users-from-accessing-local-drives-of-an-rd-session-host-server-while-using-remoteapp-programs/.

"Terminal Server (RDS) Lockdown—2003, 2008, and R2", Published on: Nov. 25, 2011 Available at: http://social.technet.microsoft.com/wiki/contents/articles/5800.terminal-server-rds-lockdown-2003-2008-and-r2.aspx.

Mayo, Roy, "How to Implement a Windows-Based Kiosk", Published on: Sep. 22, 2010 Available at: http://social.technet.microsoft.com/wiki/contents/articles/1468.how-to-implement-a-windows-based-kiosk.aspx.

* cited by examiner

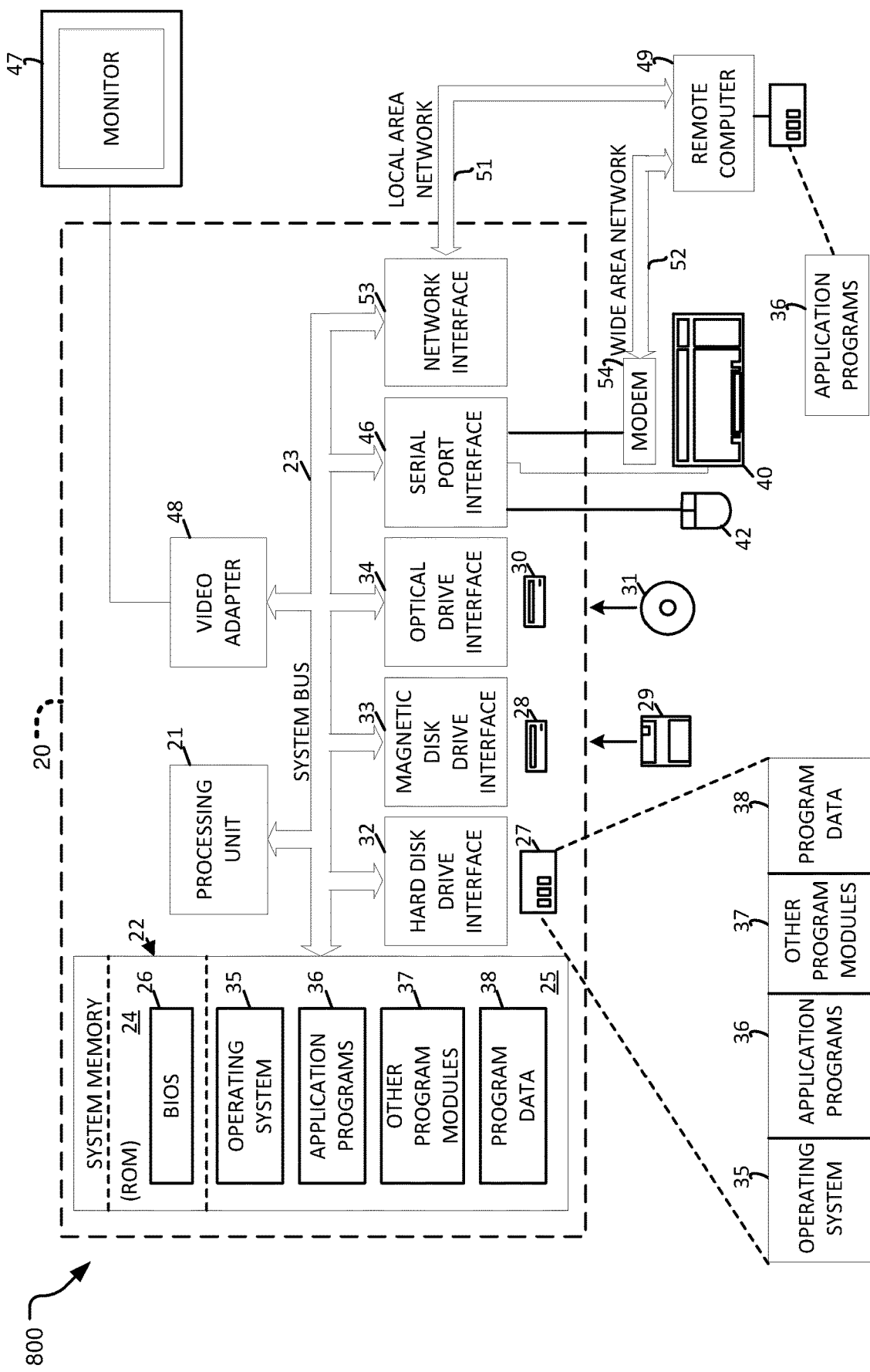

SECURE REMOTE DESKTOP SESSION

BACKGROUND

Remote desktop session host server hosts server based programs that provide remote desktop experience for remote desktop service clients. Users can connect to a remote desktop session host server to run programs, to save files, and to use network resources on that server. Users can also access a remote desktop session host server by using a remote desktop connection or by using specific applications used for providing such remote access.

SUMMARY

Implementations described herein disclose a system for providing secure remote desktop session host experience to a user for a selected application while controlling the user's access to non-core functionalities of the selected application. An implementation of the system disclosed herein determines a non-core functionality of an application running on a server, flags the executable files, shared object library files, and the registration keys necessary for the non-core functionality of the application, and disables the application's access to the flagged executable files, the identified shared object library files, and the identified registration keys.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 8 illustrates an example system that may be useful in implementing the described technology.

DETAILED DESCRIPTIONS

The technology disclosed herein restricts a user's remote desktop session to a single specific application by preventing session interaction except for running the single specific application. In one implementation, such single application remote desktop session is provided by restricting the user's access to one or more non-core functionality. In one alternate implementation, the user's access to all non-core functionality of the specific application are restricted.

The technology disclosed herein limits a non-administrative user of an application on a remote server to selected core functionalities of the application and denies such user's access to all non-core capabilities of the application. Restricting non-administrative user's access to core functionalities increases the security and reconnaissance threats common to remote desktop session host servers.

Figure 1:
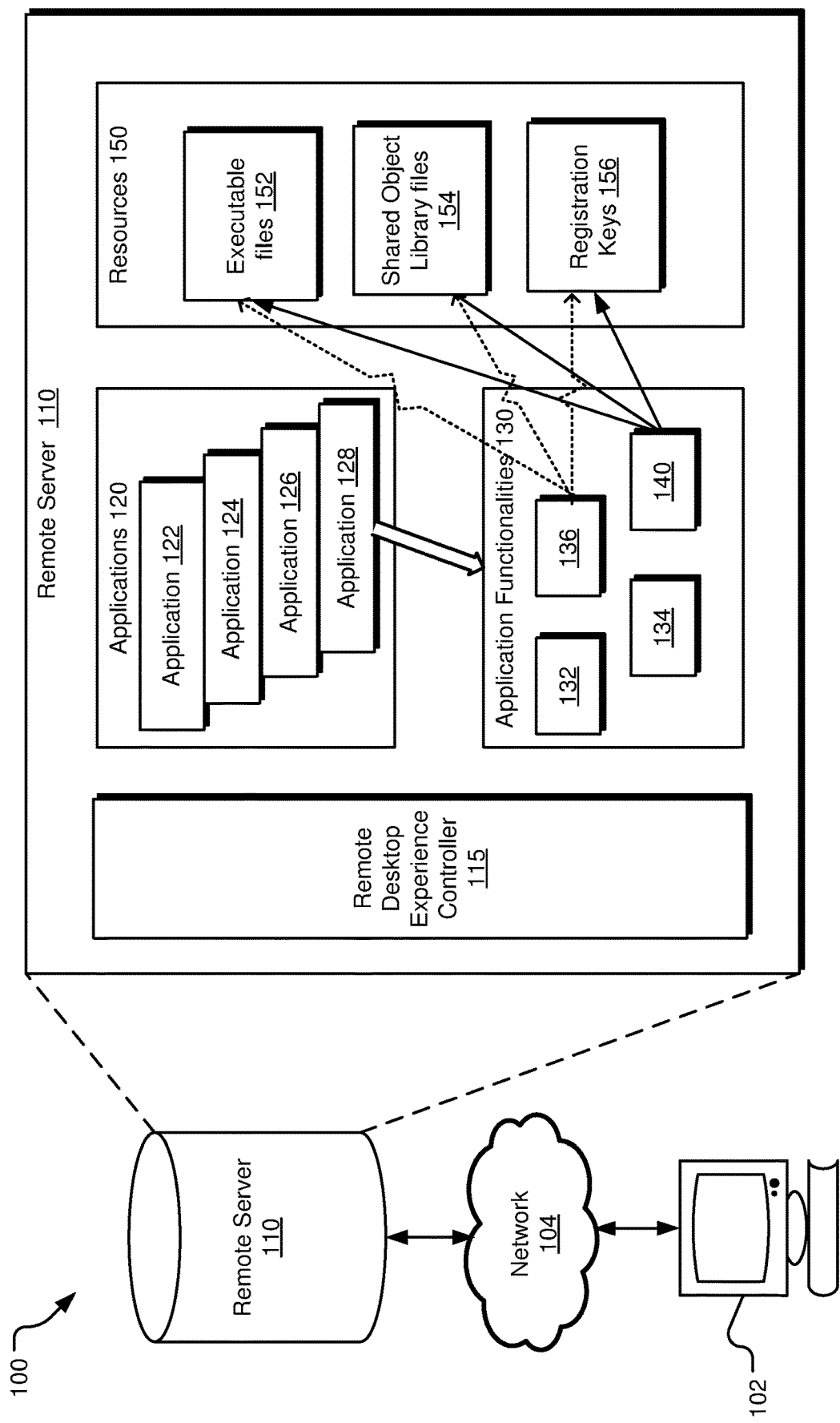
FIG. 1 illustrates an example implementation of a remote desktop host session for a user that limits the user's access to only core functionalities of an application.

FIG. 1 illustrates an implementation 100 of a remote desktop host session for a user that limits the user's access to only core functionalities of an application. Specifically, the implementation 100 discloses a user accessing a remote server 110 via a computing device 102. The computing device 102 may be, for example, a laptop, a desktop, a PDA, a smartphone, etc. The computing device 102 may access the remote server 110 via a network 104, such as the Internet, a local area network, a virtual private network, etc.

The remote server 110 may be an application server that hosts a number of different applications 120, such as the applications 122, 124, 126, 128. The implementation of the remote server 110 provides a remote desktop experience controller 115 that can restrict the user's access to a single application as well as to selected functionalities of the single application. For example, in the illustrated implementation 100, the user has access to only application 128, which for example, may be an accounting application. The user's access to applications 122, 124, and 126 is denied by the remote desktop experience controller 115.

Furthermore, the remote desktop experience controller 115 also controls the user's access to one or more functionalities of the selected application 128. For example, the selected application 128 is illustrated to have functionalities 130, such as a file structure browsing functionality 132, a move to folder functionality 134, a copy to folder functionality 136, a transaction posting functionality 140, etc.

Each of these functionalities 132-140 use one or more resources 150 of the server. For example, such resources may include executable files 152, various shared object library files 154, registration keys 156, etc. For example, in certain operating systems, dynamic link libraries or dll files are used as shared object library files 154 and certain functionalities require use of one or more of such dll files. As an example, a shared object library file 154 may be necessary for the application 128 to use a common dialog based functionality, such as a common open/save dialog, another shared object library file 154 may be necessary to open a search from a start menu, etc. Similarly, a registration key 156 may be required by a "copy to folder" functionality of the application 128.

The remote desktop experience controller 115 determines one or more of such resources that are not necessary for the non-core functionalities 132-136 of the application 128 and restricts the application 128's access to these resources. As a result, the application 128 is unable to execute any of such non-core functionalities 132-136. Similarly, the remote desktop experience controller 115 determines that the "copy to folder" functionality of the application 128 is a non-core functionality and it may disable the application 128's access to the registration key 156 necessary to execute the "copy to folder" functionality, thus preventing the application 128 from executing the "copy to folder" function.

Figure 2:
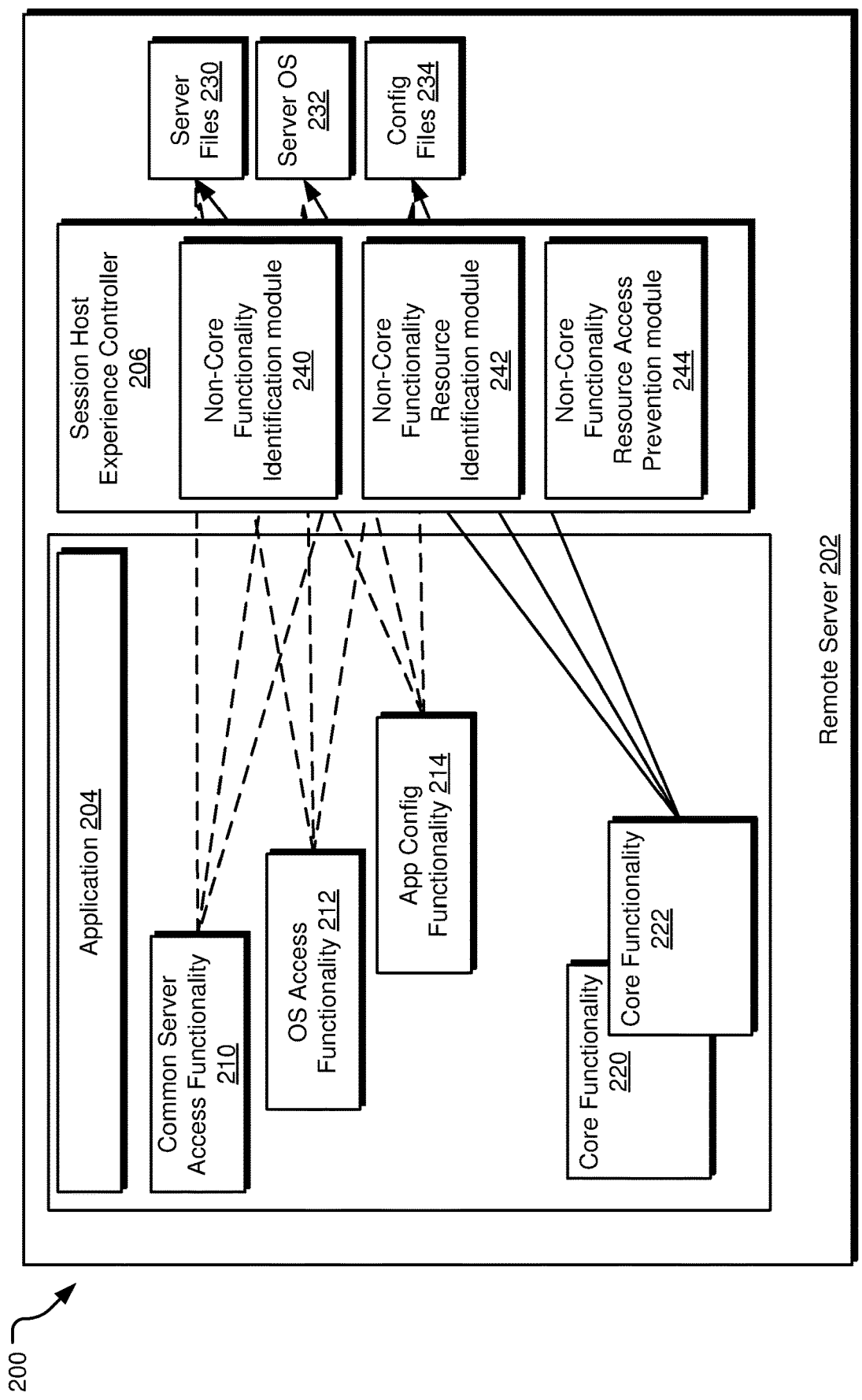
FIG. 2 illustrates an alternate example implementation of a remote desktop host session for a user that limits the user's access to only core functionalities of an application.

FIG. 2 illustrates an implementation 200 of a remote desktop host session for a user that limits the user's access to only core functionalities of an application. Specifically, the implementation 200 illustrates a remote server 202 that hosts an application 204 that can be accessed by a user in a remote desktop session. As illustrated, the application includes a number of non-core functionalities 210-214 and core functionalities 220, 222.

The non-core functionalities 210-214 may include, for example, a common server access functionality 210 to accesses server configuration files 230, an operating system access functionality 212 that accesses the operation system 232 of the server, and an application configuration functionality 214 that accesses application configuration files 234 of the application 204. These non-core functionalities 210-214 may provide a back door access to the user of the application 204 to functions, reconnaissance, etc., on the remote server 202 that are not intended to be accessible to the application 204.

To prevent the application 204's access to the server files 230, the server operating system 232, and/or the application configuration files 234, a session host experience controller 206 restricts the application 204's access to one or more resources that are necessary for the non-core functionalities 210-214 to operate. For example, the session host experience controller 206 may include a non-core functionality identification module 240 that identifies one or more of the non-core functionalities 210-214. In one implementation, a user interface may be provided by the session host experience controller 206 to receive a list of non-core functionalities 210-214 from an administrator of the remote server 202. Alternatively, the non-core functionalities 210-214 may be determined using product documentation, application execution observation, operating System auditing and logging technologies, etc. Furthermore, one or ore applications dedicated to discovery of dependencies within another application may also be used to determine the non-core functionalities 210-214.

The session host experience controller 206 also includes a non-core functionality resource identification module 242, which determines the resources that are necessary for one or more of the non-core functionality to execute. For example, such resources may include various executable files, shared object library files, registration keys, etc. The non-core functionality resource identification module 242 may tabulate and store the list of such resources for each of the non-core functionalities 210-214. The non-core functionality resource identification module 242 may also flag each of such resources for each of the non-core functionalities 210-214. A non-core functionality resource access prevention module 244 disables the non-core functionalities 210-214's access to such identified resources.

In one implementation, the non-core functionality resource access prevention module 244 may be implemented using a group policy object (GPO) of a server. Specifically, group policy preferences as per the GPO may disable the non-core functionalities 210-214's access to such identified resources. For example, group policy preferences to disable access to the identified resources are set by running a scheduled task on the server under a system context. Such task may be run on a periodic basis, such as for example daily, to enforce the group policy preferences.

Figure 3:
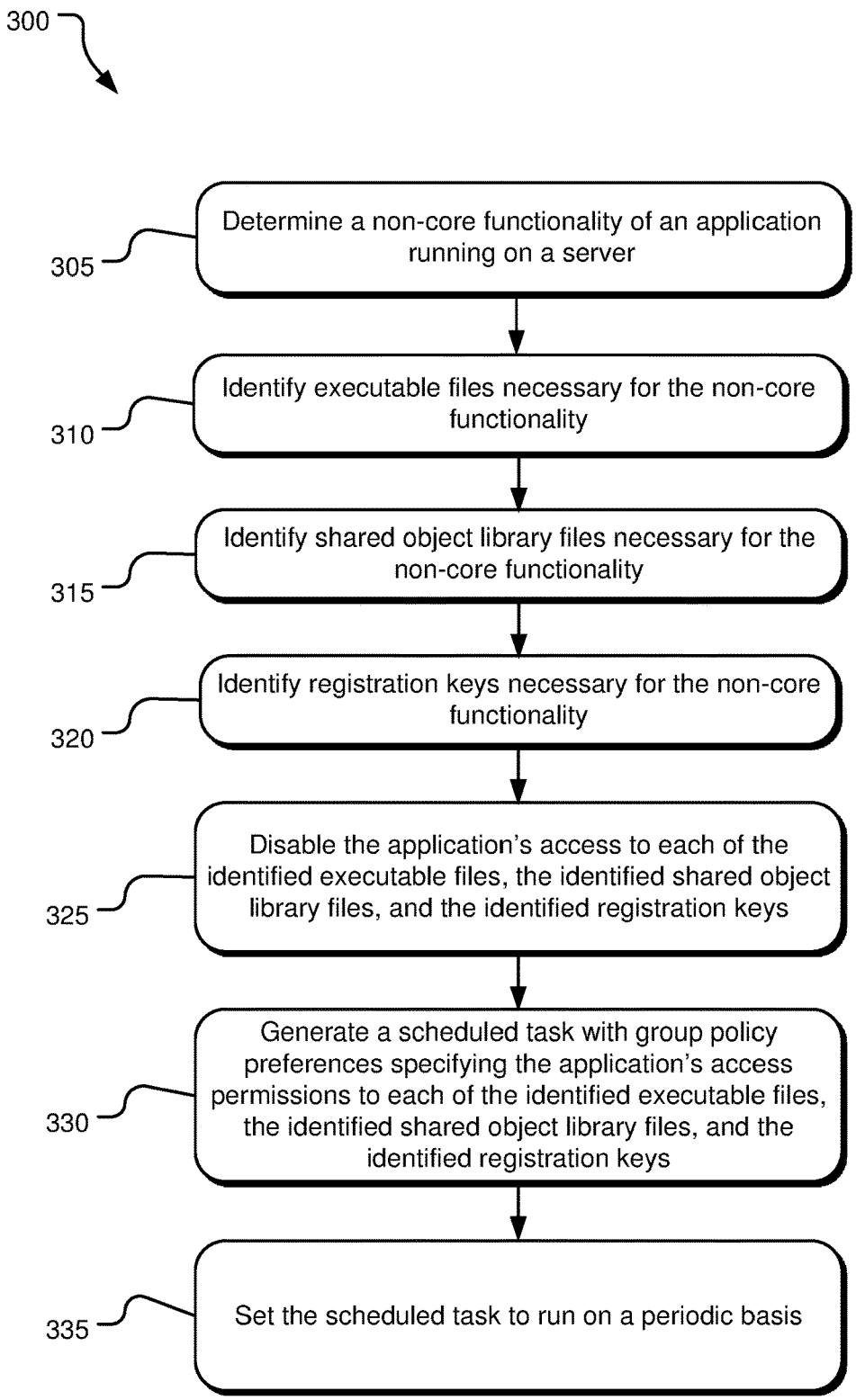
FIG. 3 illustrates example operations for restricting a user's remote desktop host experience to core functionalities of an application.

FIG. 3 illustrates operations 300 for restricting the access by an application to a non-core functionality of that application. An operation 305 determines a non-core functionality of an application running on a server. For example, a processor may determine a functionality of the application running on a server when the functionality accesses the operating system of the server. Alternatively, a processor embedded on the server may determine a functionality of the application to be non-core when it accesses a server file that is not a part of the application.

An operation 310 identifies and flags executable files necessary for the non-core functionality. For example, a processor embedded on the server may keep track of all requests to various executable files and when a non-core functionality of the application accesses one of such executable files, the processor may mark the executable file as one necessary for the non-core functionality. An operation 315 identifies and flags shared object library files necessary for the non-core functionality. For example, a processor embedded on the server may keep track of all requests to various object library files and when a non-core functionality of the application accesses one of such a shared object library file, the processor may mark the shared object library file as one necessary for the non-core functionality. An operation 320 identifies and flags registration keys necessary for the non-core functionality. For example, a processor embedded on the server may keep track of all requests to various registration keys and when a non-core functionality of the application accesses one of such registration keys, the processor may mark the registration key as one that is necessary for the non-core functionality.

After identifying and flagging various resources necessary for the non-core functionality, an operation 325 disables the application's access to each of the identified resources, including the identified executable files, the identified shared object library files, and the identified registration keys. For example, a processor embedded on the server running the application may disable the application's access to such resources by changing the configuration of the server so as to restrict the application's access. An operation 330 generates a scheduled task with group policy preferences specifying the application's access permissions to each of the identified executable files, the identified shared object library files, and the identified registration keys. An operation 335 sets the scheduled task to run on a periodic basis, such as daily to enforce the group policy preferences.

While the operations 300 are illustrated for restricting the access by an application to a single non-core functionality of that application, in an alternative implementation, the operations may be repeated to restrict the application's access to more than one non-core functionalities. For example, a processor running on the server can iteratively run all functionalities of an application and for each non-core functionality determine the resources that are necessary for running such non-core functionalities.

Figure 4:
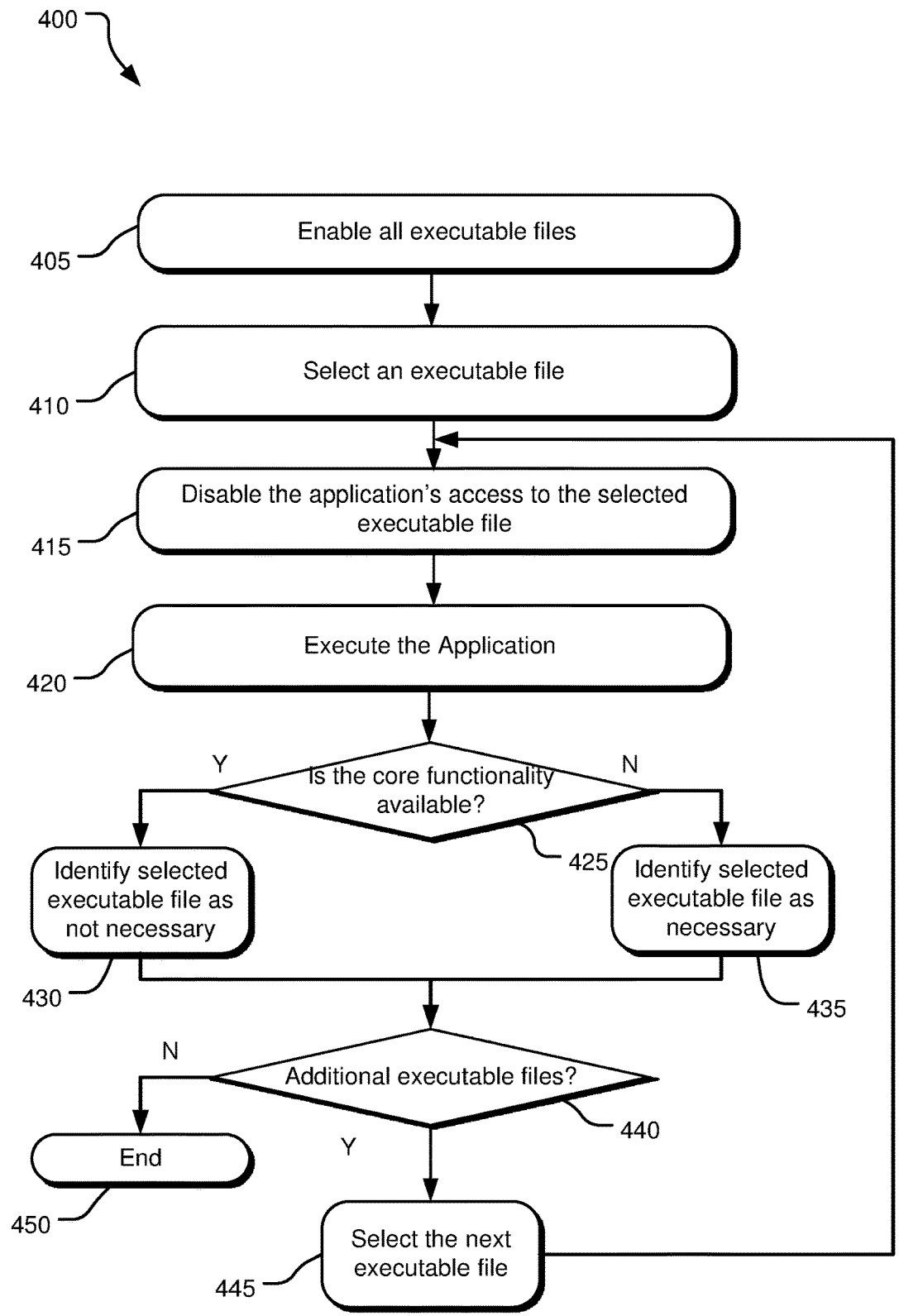
FIG. 4 illustrates example operations for selecting executable files necessary for running a core functionality of an application.

FIG. 4 illustrates operations 400 for selecting executable files necessary for running a core functionalities of an application as well as executable files that are not necessary for running a core functionality of an application. Specifically, the operations 400 allows a processor to create a list of only those executable files that are necessary for a given core functionality of an application. For example, these executable files may be the executable files that are required to run or required to execute the given core functionality of the application. Such list may be saved by the processor to determine which executable files are disabled so as to ensure secure remote desktop session host experience to a user.

The operations 400 iteratively disable each of the executable files on the server and determine which executable file's disabling results in the core functionality to be unavailable to the application. An operation 405 enables all executable files on the server and then an operation 410 selects an executable file. The application's access to the selected executable file is disabled by an operation 415. With the access to the selected executable file disabled, an operation 420 executes the application.

A determining operation 425 determines whether the core functionality is still available to the application even with the selected executable file being disabled. If it is determined that the core functionality is still available, an operation 430 identifies the selected executable file as one that is not necessary for the core functionality. In this case, the server may decide to restrict the application's access to such executable file to increase the security of the remote desktop session host experience. However, if it is determined that the core functionality is not available, an operation 435 identifies the selected executable file as one that is necessary for the execution of the core functionality.

The operations 430 and 435 may save the list of executable file identifications in a table or in other form. In one implementation, a remote desktop experience controller on the server may disable all executable files that are not necessary to operate the core functionality. As a result, when a user accesses the application via a remote desktop session, the user's session is limited to only the core functionality of the application and the user is not able to access any other functionality that may inadvertently expose the server to reconnaissance and/or breach.

Subsequently an operation 440 determines if any additional executable files are to be evaluated for being necessary for execution of the core functionality of an application. If there are such additional executable files, an operation 445 selects such next executable file and the evaluation operations are repeated. Otherwise, the operations 400 end at an operation 450.

Figure 5:
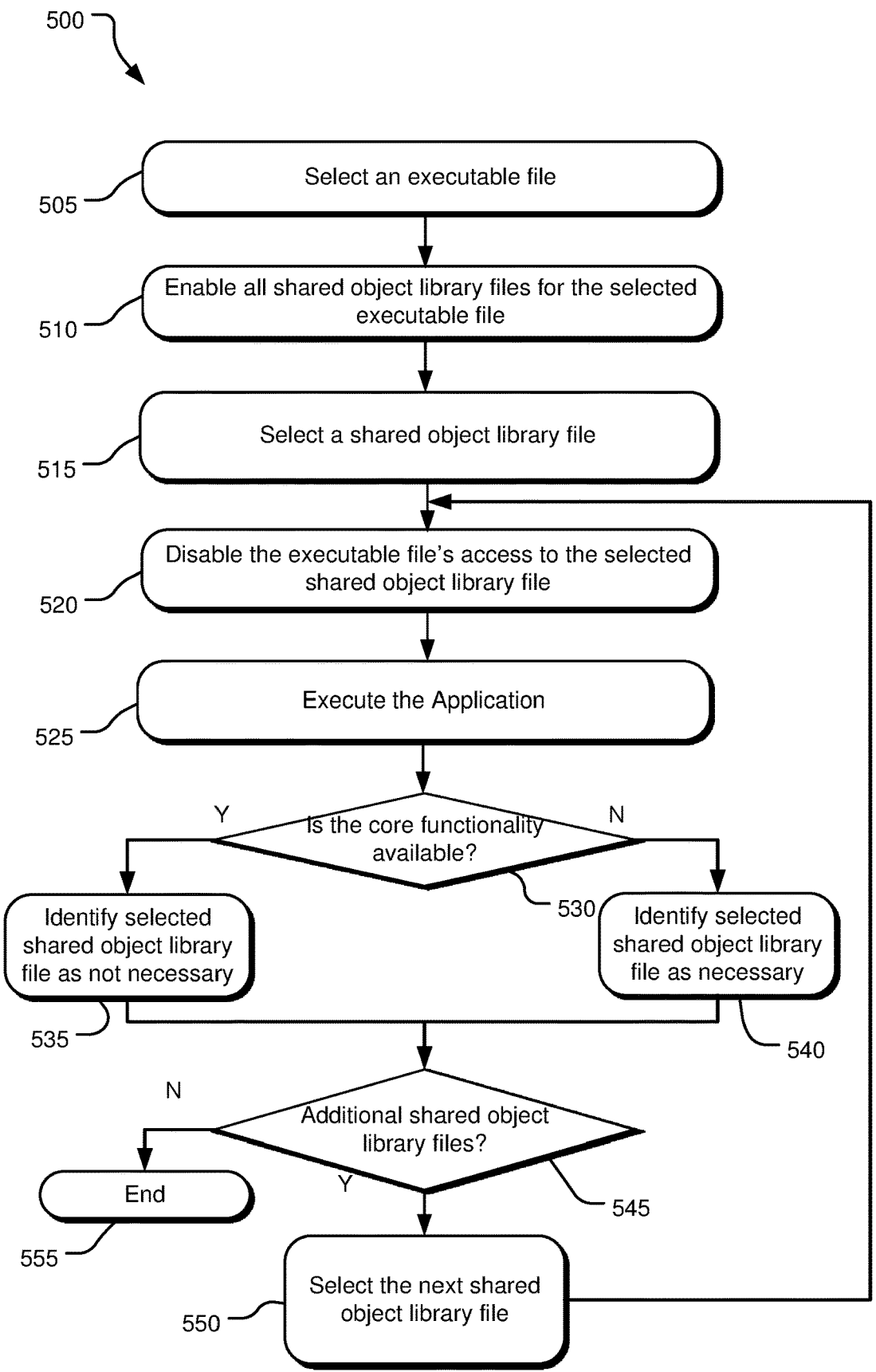
FIG. 5 illustrates example operations for selecting, for each necessary executable file, the shared object library files necessary for running a core functionality of an application.

FIG. 5 illustrates operations 500 for selecting, for each necessary executable file, the shared object library files necessary for running a core functionality of an application as well as the shared object library files that are not necessary for running the selected executable file and therefore a core functionality of the application. Specifically, the operations 500 allows a processor to create a list of only those shared object library files that are necessary for a given core functionality of an application. For example, these shared object library files may be the shared object library files that are required to run or required to execute the given core functionality of the application. Such list may be saved by the processor to determine access to which shared object library files is to be disabled so as to ensure secure remote desktop session host experience to a user.

The operations 500 iteratively disable each of the various shared object library files on the server and determine which shared object library file's disabling results in the core functionality to be unavailable to the application. The operations 500 may be used for evaluating the list of shared object library files that are called from all executable files or only for evaluating the list of shared object library files for only those executable files that are deemed to be necessary for running a core functionality of an application. Either way, an operation 505 selects an executable file for which a list of necessary shared object library files is to be determined.

An operation 510 enables all shared object library files on the server for the selected executable file and then an operation 515 selects a shared object library file. The application's access to the selected shared object library file is disabled by an operation 520. With the access to the selected shared object library file disabled, an operation 525 executes the application.

A determining operation 530 determines whether the core functionality is still available to the application even with access to the selected shared object library file being disabled. If it is determined that the core functionality is still available, an operation 535 identifies the selected shared object library file as one that is not necessary for the core functionality. In this case, the server may decide to restrict the application's access to such shared object library file to increase the security of the remote desktop session host experience. However, if it is determined that the core functionality is not available with the denial of access to the selected shared object library file, an operation 540 identifies the selected shared object library file as one that is necessary for the execution of the core functionality.

The operations 535 and 540 may save the list of shared object library file identifications in a table or in other form. In one implementation, a remote desktop experience controller on the server may disable all shared object library file that are not necessary to operate the core functionality of an application. As a result, when a user accesses the application via a remote desktop session, the user's session is limited to only the core functionality of the application and the user is not able to access any other functionality that may inadvertently expose the server to reconnaissance and/or breach.

Subsequently an operation 545 determines if any additional shared object library files are to be evaluated as being necessary for execution of the core functionality of an application. If there are such additional shared object library files, an operation 550 selects such next shared object library file and the evaluation operations are repeated. Otherwise, the operations 500 end at an operation 555.

Figure 6:
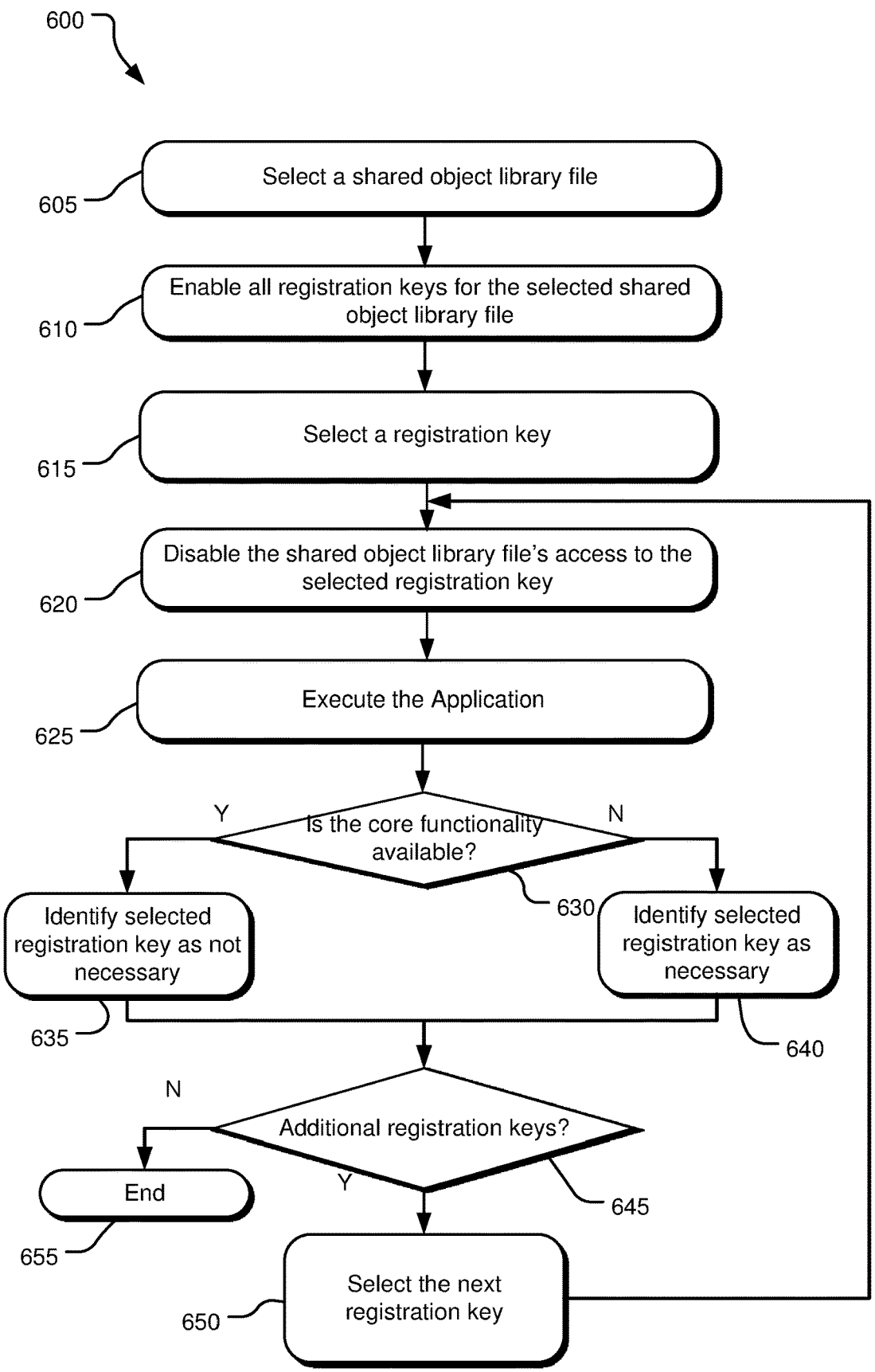
FIG. 6 illustrates example operations for selecting, for each necessary shared object library file, the registration keys necessary for running a core functionality of an application.

FIG. 6 illustrates operations 600 for selecting, for each necessary shared object library file, the registration keys necessary for running a core functionality of an application as well as the registration keys that are not necessary for running the selected shared object library file and therefore a core functionality of the application. Specifically, the operations 600 allows a processor to create a list of only those registration keys that are necessary for a given core functionality of an application. For example, these registration keys may be the registration keys that are required to run or required to execute the given core functionality of the application. Such list may be saved by the processor to determine access to which registration keys is to be disabled so as to ensure secure remote desktop session host experience to a user.

The operations 600 iteratively disable each of the various registration keys on the server and determine which registration key's disabling results in the core functionality to be unavailable to the application. The operations 600 may be used for evaluating the list of registration keys that are called from all shared object library files or only for evaluating the list of registration keys for only those shared object library files that are deemed to be necessary for running a core functionality of an application. Either way, an operation 605 selects a shared object library file for which a list of necessary registration keys is to be determined.

An operation 610 enables all registration keys on the server and then an operation 615 selects a registration key. The application's access to the selected registration key is disabled by an operation 620. With the access to the selected registration key disabled, an operation 625 executes the application.

A determining operation 630 determines whether the core functionality is still available to the application even with access to the selected registration key being disabled. If it is determined that the core functionality is still available, an operation 635 identifies the selected registration key as one that is not necessary for the core functionality. In this case, the server may decide to restrict the application's access to such registration key to increase the security of the remote desktop session host experience. However, if it is determined that the core functionality is not available with the denial of access to the selected registration key, an operation 640 identifies the selected registration key as one that is necessary for the execution of the core functionality.

The operations 635 and 640 may save the list of registration key identifications in a table or in other form. In one implementation, a remote desktop experience controller on the server may disable access to all registration keys that are not necessary to operate the core functionality of an application. As a result, when a user accesses the application via a remote desktop session, the user's session is limited to only the core functionality of the application and the user is not able to access any other functionality that may inadvertently expose the server to reconnaissance and/or breach.

Subsequently an operation 645 determines if any additional registration keys are to be evaluated as being necessary for execution of the core functionality of an application. If there are such additional registration keys, an operation 650 selects such next registration key and the evaluation operations are repeated. Otherwise, the operations 600 end at an operation 655.

Figure 7:
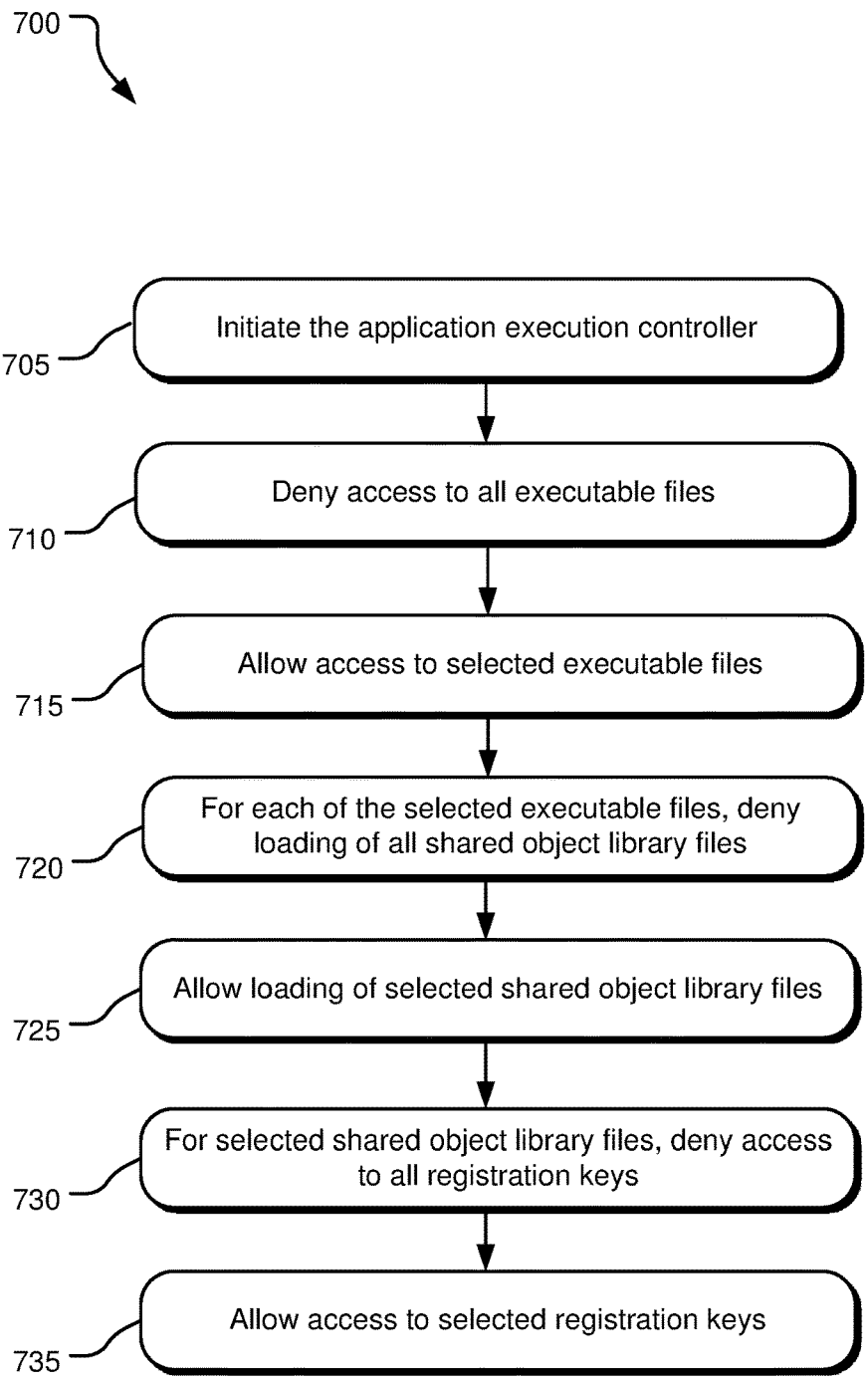
FIG. 7 illustrates example operations for enabling an application's access to selected executable files, shared object library files, and registration keys.

FIG. 7 illustrates operations 700 for enabling an application's access to selected executable files, shared object library files, and registration keys, where such selected executable files, shared object library files, and registration keys allow a secure access to core functionalities of an application running on a server.

An operation 705 initiates an application execution controller. Such an application execution controller may be in the form of a number of instructions stored on a memory, wherein the instructions are executed by one or more processors. Alternatively, the instructions of the application execution controller may be encoded as firmware and they work with various tables that are used to store the list of selected executable files, shared object library files, and registration keys.

An operation 710 denies access to all executable files on the server. As a result, no application is able to run on the server. Subsequently, an operation 715 selectively activates the application's access to selected executable files. Such selected executable files may be determined to be those executable files that are necessary for the core functionalities of the application. For each of the selected executable files that the application is provided access, an operation 720 denies loading of all shared object library files. At this point even if the application can access the selected executable files, it is not able to run the core functionality as the executable files do not have access to the necessary shared object library files. An operation 725 selectively allows loading of selected shared object library files. Such selected shared object library files may be determined to be those shared object library files that are necessary for the core functionalities of the application. An operation 730 denies access to all registration keys. Subsequently an operation 735 provides access to selected registration keys as necessary by the application. Here the selected registration keys may be determined to be necessary for executing the core functionalities of the application.

The operations 700 result in providing a secure remote host session experience to a user where the user is able to use all the core functionalities of an application as intended. However, the user is not able to perform any non-core functions, thus limiting any data breach or reconnaissance operations on the server by remote users.

FIG. 8 illustrates an example system 800 that may be useful in implementing the described technology for providing secure remote desktop session. The example hardware and operating environment of FIG. 8 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 8, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing secure remote desktop session may be stored in memory 22 and/or storage devices 29 or 31 and processed by the processing unit 21. Rules for providing secure remote desktop session may be stored in memory 22 and/or storage devices 29 or 31 as persistent datastores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The system for secure remote desktop session may include a variety of tangible computer-readable storage media and intangible computer-readable communication signals. Tangible computer-readable storage can be embodied by any available media that can be accessed by the remote desktop experience controller 115 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the remote desktop experience controller 115. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example physical article of manufacture includes one or more tangible computer-readable storage media, encoding computer-executable instructions for executing on a computer system a computer process, the computer process including flagging each executable files, shared object library files, and registration keys necessary for a non-core functionality of the application and disabling the application's access to the flagged executable files, the identified shared object library files, and the identified registration keys.

Another example physical article of manufacture includes one or more tangible computer-readable storage media, encoding computer-executable instructions for executing on a computer system a computer process, the computer process including determining the non-core functionality of the application by determining functionalities that access a server configuration file as a non-core functionality.

Another example physical article of manufacture includes one or more tangible computer-readable storage media, encoding computer-executable instructions for executing on a computer system a computer process, the computer process including determining functionalities that access a server operating system as a non-core functionality.

Another example physical article of manufacture includes one or more tangible computer-readable storage media, encoding computer-executable instructions for executing on a computer system a computer process, the computer process including determining functionalities that access an application configuration file as a non-core functionality.

Another example physical article of manufacture includes one or more tangible computer-readable storage media, encoding computer-executable instructions for executing on a computer system a computer process, wherein the non-core functionality of the application is a common dialog based functionality.

Another example physical article of manufacture includes one or more tangible computer-readable storage media, encoding computer-executable instructions for executing on a computer system a computer process, wherein disabling the application's access to the common dialog based functionality further comprises disabling the application's access to the registration keys necessary to execute the common dialog based functionality.

Another example physical article of manufacture includes one or more tangible computer-readable storage media, encoding computer-executable instructions for executing on a computer system a computer process, wherein disabling the application's access to the identified shared object library files further comprises disabling the application's access to the identified shared object library files using an application execution controller.

Another example physical article of manufacture includes one or more tangible computer-readable storage media, encoding computer-executable instructions for executing on a computer system a computer process, wherein the computer process further comprising generating a scheduled task with group policy preferences specifying the application's access permissions to the identified executable files, the identified shared object library files, and the identified registration keys.

Another example physical article of manufacture includes one or more tangible computer-readable storage media, encoding computer-executable instructions for executing on a computer system a computer process, wherein the computer process further comprising running the scheduled task on the server on a periodic basis to enforce the group policy preferences.

A method of providing a secure remote desktop session includes determining a non-core functionality of an application running on a server, identifying a plurality of non-core functionality resources necessary for executing the non-core functionality and disabling the application's access to the plurality of non-core functionality resources necessary for executing the non-core functionality.

Another method of providing a secure remote desktop session provides the plurality of non-core functionality resources including one or more executable files accessed by the non-core functionality and disabling the application's access to the plurality of non-core functionality resources further comprises restricting the application's access of the one or more executable files.

Another method of providing a secure remote desktop session provides the plurality of non-core functionality resources including one or more shared object library files accessed by the one or more executable files and disabling the application's access to the plurality of non-core functionality resources further comprises restricting the one or more executable files' access of the one or more shared object library files.

Another method of providing a secure remote desktop session provides the plurality of non-core functionality resources including one or more identification keys accessed by the one or more shared object library files and disabling the application's access to the plurality of non-core functionality resources further comprises restricting the one or more shared object library files' access of the one or more identification keys.

Another method of providing a secure remote desktop session provides disabling the application's access to the plurality of non-core functionality resources further comprising generating a task to be run on a periodic basis on the server, the task configured to set group policy preferences to disable the application's access to the plurality of non-core functionality resources necessary for executing the non-core functionality.

An example system includes a memory, one or more processing units, a non-core functionality identification module stored in the memory and executable by the one or more processor units, the non-core functionality identification module configured to determine a non-core functionality of an application running on a server and a non-core functionality resource identification module stored in the memory and executable by the one or more processor units, the non-core functionality resource identification module configured to identifying a plurality of non-core functionality resources necessary for executing the non-core functionality and a non-core functionality resource access prevention module stored in the memory and executable by the one or more processor units, the non-core functionality resource access prevention module configured to disable the application's access to the plurality of non-core functionality resources.

Another example system has the non-core functionality resource identification module further configured to identify at least one of an executable file, a shared object library file, and an identification key as one or more of the plurality of non-core functionality resources necessary for executing the non-core functionality.

Another example system has the non-core functionality resource access prevention module further configured to generate a scheduled task with group policy preferences specifying the application's access permissions to the non-core functionality resources necessary for executing the non-core functionality.

Another example system has the non-core functionality resource access prevention module further configured to run the scheduled task on the server on a periodic basis to enforce the group policy preferences. In another example system the non-core functionality of the application is a common dialog based functionality.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more non-transitory computer-readable storage media, encoding computer-executable instructions for executing on a computer system a computer process, the computer process comprising:
  flagging one or more of executable files, shared object library files, and registration keys necessary for a non-core functionality of an application;
  disabling the application's access to the flagged executable files, the flagged shared object library files, and the flagged registration keys; and
  determining the non-core functionality of the application by determining functionalities that access a server configuration file as the non-core functionality,
  wherein disabling the application's access to the flagged shared object library files further comprises disabling the application's access to the flagged shared object library files using an application execution controller.

2. The physical article of manufacture of claim 1, wherein determining the non-core functionality of the application further comprises determining functionalities that access a server operating system as a non-core functionality.

3. The physical article of manufacture of claim 1, wherein determining the non-core functionality of the application further comprises determining functionalities that access an application configuration file as a non-core functionality.

4. The physical article of manufacture of claim 1, wherein the non-core functionality of the application is a common dialog based functionality.

5. The physical article of manufacture of claim 4, wherein disabling the application's access to the common dialog based functionality further comprises disabling the application's access to the registration keys necessary to execute the common dialog based functionality.

6. The physical article of manufacture of claim 1, wherein the computer process further comprising generating a scheduled task with group policy preferences specifying the application's access permissions to the flagged executable files, the flagged shared object library files, and the flagged registration keys.

7. The physical article of manufacture of claim 6, wherein the computer process further comprising running the scheduled task on the server on a periodic basis to enforce the group policy preferences.

8. A method, implemented by one or more computer-executable instructions stored on a non-transitory memory for executing on a computer system, of providing a secure remote desktop session, the method comprising:
  determining a non-core functionality of an application running on a server by determining functionalities that access a server configuration file as the non-core functionality;
  identifying a plurality of non-core functionality resources necessary for executing the non-core functionality; and
  disabling the application's access to the plurality of non-core functionality resources necessary for executing the non-core functionality,
  wherein the plurality of non-core functionality resources comprises one or more executable files accessed by the non-core functionality and disabling the application's access to the plurality of non-core functionality resources further comprises restricting the application's access to the one or more executable files.

9. The method of claim 8, wherein the plurality of non-core functionality resources comprises one or more shared object library files accessed by the one or more executable files and disabling the application's access to the plurality of non-core functionality resources further comprises restricting the one or more executable files' access of the one or more shared object library files.

10. The method of claim 9, wherein the plurality of non-core functionality resources comprises one or more identification keys accessed by the one or more shared object library files and disabling the application's access to the plurality of non-core functionality resources further comprises restricting the one or more shared object library files' access of the one or more identification keys.

11. The method of claim 8, wherein disabling the application's access to the plurality of non-core functionality resources further comprising generating a task to be run on a periodic basis on the server, the task configured to set group policy preferences to disable the application's access to the plurality of non-core functionality resources necessary for executing the non-core functionality.

12. The method of claim 8, wherein determining the non-core functionality of the application running on the server further comprises determining functionalities that access at least one an application configuration file and server operating system.

13. A system comprising:
  non-transitory memory;
  one or more processor units;
  a non-core functionality identification module stored in the non-transitory memory and executable by the one or more processor units, the non-core functionality identification module configured to determine a non-core functionality of an application running on a server by determining functionalities that access a server configuration file as the non-core functionality;
  a non-core functionality resource identification module stored in the memory and executable by the one or more processor units, the non-core functionality resource identification module configured to identifying a plurality of non-core functionality resources necessary for executing the non-core functionality; and
  a non-core functionality resource access prevention module stored in the memory and executable by the one or more processor units, the non-core functionality resource access prevention module configured to disable the application's access to the plurality of non-core functionality resources,
  wherein the plurality of non-core functionality resources comprises one or more executable files accessed by the non-core functionality and disabling the application's access to the plurality of non-core functionality resources further comprises restricting the application's access to the one or more executable files.

14. The system of claim 13, wherein the non-core functionality resource identification module is further configured to identify at least one of an executable file, a shared object library file, and an identification key as one or more of the plurality of non-core functionality resources necessary for executing the non-core functionality.

15. The system of claim 14, wherein the non-core functionality resource access prevention module is further configured to generate a scheduled task with group policy preferences specifying the application's access permissions to the non-core functionality resources necessary for executing the non-core functionality.

16. The system of claim 15, wherein the non-core functionality resource access prevention module is further configured to run the scheduled task on the server on a periodic basis to enforce the group policy preferences.

17. The system of claim 13, wherein the non-core functionality of the application is a common dialog based functionality.

\* \* \* \* \*